United States Patent
Huang et al.

(10) Patent No.: US 11,686,628 B2
(45) Date of Patent: Jun. 27, 2023

(54) SMART REFRIGERATION USING DISTRIBUTED FIBER OPTIC SENSING

(71) Applicant: NEC Laboratories America, Inc., Princeton, NJ (US)

(72) Inventors: Ming-Fang Huang, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 104 days.

(21) Appl. No.: 17/227,309

(22) Filed: Apr. 10, 2021

(65) Prior Publication Data

US 2021/0318180 A1  Oct. 14, 2021

Related U.S. Application Data

(60) Provisional application No. 63/008,869, filed on Apr. 13, 2020.

(51) Int. Cl.
| | | |
|---|---|---|
| *G01K 11/32* | (2021.01) | |
| *G01K 3/00* | (2006.01) | |
| *G08B 21/18* | (2006.01) | |
| *F25D 29/00* | (2006.01) | |

(52) U.S. Cl.
CPC ............ *G01K 11/32* (2013.01); *F25D 29/008* (2013.01); *G01K 3/005* (2013.01); *G08B 21/182* (2013.01); *F25D 2700/12* (2013.01)

(58) Field of Classification Search
CPC ....... A47F 3/0439; F24F 1/0071; F24F 11/49; F25B 49/005; F25B 49/02; F25D 29/00; F25D 29/008; F25D 2700/12; G01F 1/28; G01H 9/004; G01K 3/005; G01K 11/32; G05B 19/0425; G05B 19/4183; G05B 23/024; G08B 21/182; H02J 4/00
USPC .......................................................... 340/585
See application file for complete search history.

(56) References Cited

U.S. PATENT DOCUMENTS

| | | | |
|---|---|---|---|
| 5,146,521 A * | 9/1992 | Hartog | G01M 11/33 250/231.19 |
| 5,963,680 A * | 10/1999 | Kleinerman | G01J 5/52 385/127 |
| 6,937,151 B1 | 8/2005 | Tapanes | |
| 2004/0011950 A1 | 1/2004 | Harkins | |
| 2007/0069867 A1 * | 3/2007 | Fleisch | G06Q 10/087 340/309.16 |
| 2007/0214812 A1 | 9/2007 | Wagner et al. | |
| 2011/0292377 A1 * | 12/2011 | Osenberg | G01D 5/268 356/73 |
| 2012/0078534 A1 * | 3/2012 | Selker | G01K 11/32 702/33 |
| 2012/0250722 A1 * | 10/2012 | Barfoot | G08B 17/06 374/1 |
| 2013/0333474 A1 | 12/2013 | Godfrey et al. | |
| 2014/0036957 A1 * | 2/2014 | Farhadiroushan | G01M 11/086 374/161 |
| 2016/0300422 A1 * | 10/2016 | Mason | G07F 11/007 |
| 2017/0146423 A1 * | 5/2017 | Hadley | G01M 3/002 |
| 2017/0300847 A1 * | 10/2017 | Jones | F25D 13/00 |

\* cited by examiner

*Primary Examiner* — Stephen R Burgdorf
(74) *Attorney, Agent, or Firm* — Joseph Kolodka

(57) ABSTRACT

Aspects of the present disclosure describe distributed fiber optic sensing (DFOS) systems, methods, and structures that advantageously enable smart refrigeration systems including retail.

1 Claim, 3 Drawing Sheets

SMART REFRIGERATION USING DISTRIBUTED FIBER OPTIC SENSING

CROSS REFERENCE

This disclosure claims the benefit of U.S. Provisional Patent Application Ser. No. 63/008,869 filed 13 Apr. 2020 the entire contents of which is incorporated by reference as if set forth at length herein.

TECHNICAL FIELD

This disclosure relates generally to distributed fiber optic sensing (DFOS) systems, methods, and structures as an enabling component of smart refrigeration systems including retail.

BACKGROUND

As is known, the development of effective, reliable, and widely available refrigeration systems is a societal priority—given the multidimensional roles that refrigeration plays in the sustainable development of contemporary society. Given this importance, systems, methods, and structures which facilitate their development, efficiency, and/or reliability would represent a significant advance in the art.

SUMMARY

An advance in the art is made according to aspects of the present disclosure directed to distributed fiber optic sensing systems (DFOS), methods, and structures that advantageously enable and/or facilitate the efficiency, favorable power consumption, cost, maintenance, monitoring, and operation of refrigeration systems.

According to aspects of the present disclosure—and in sharp contrast to the prior art—system, methods, and structures according to aspects of the present disclosure utilize DOFS systems, methods, and structures to monitor and manage the operation of refrigeration systems.

BRIEF DESCRIPTION OF THE DRAWING

A more complete understanding of the present disclosure may be realized by reference to the accompanying drawing in which.

DESCRIPTION

Figure 1:
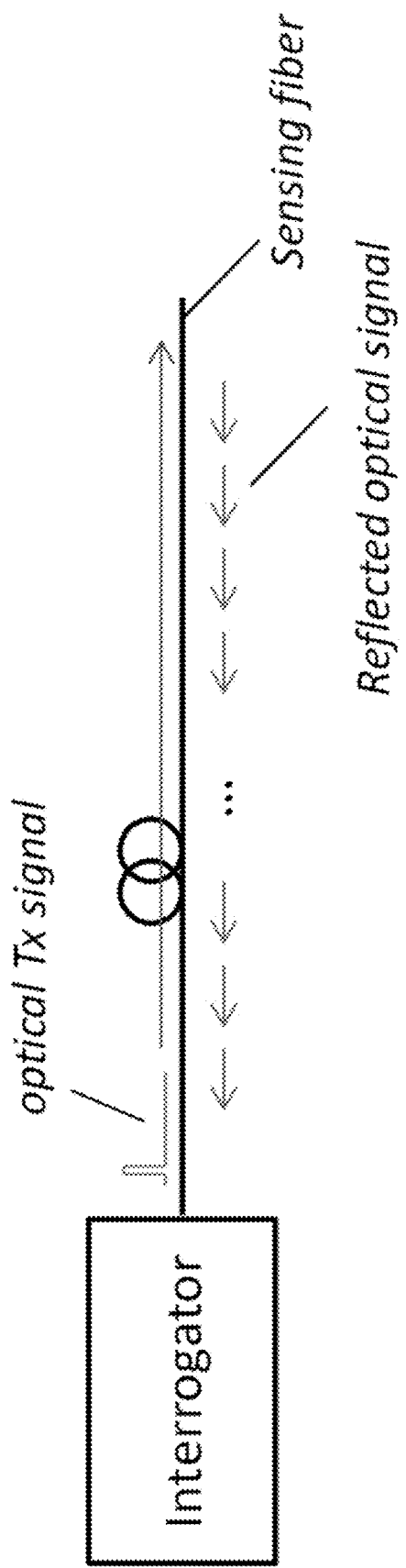
FIG. 1 is a schematic diagram of an illustrative distributed fiber optic sensing system and operation generally known in the art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DVS (Distributed Vibration Sensor) and/or DAS (Distributed Acoustic Sensor) and/or DSS (Distributed Strain Sensor), interrogator to recover a vibration occurring anywhere along a sensing fiber in equivalent sampling frequency of the pulse repetition rate. For example, for a DVS or DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule. In addition, other sensors in communication with the DFOS may advantageously provide the monitoring of gas molecules as well.

Figure 2:
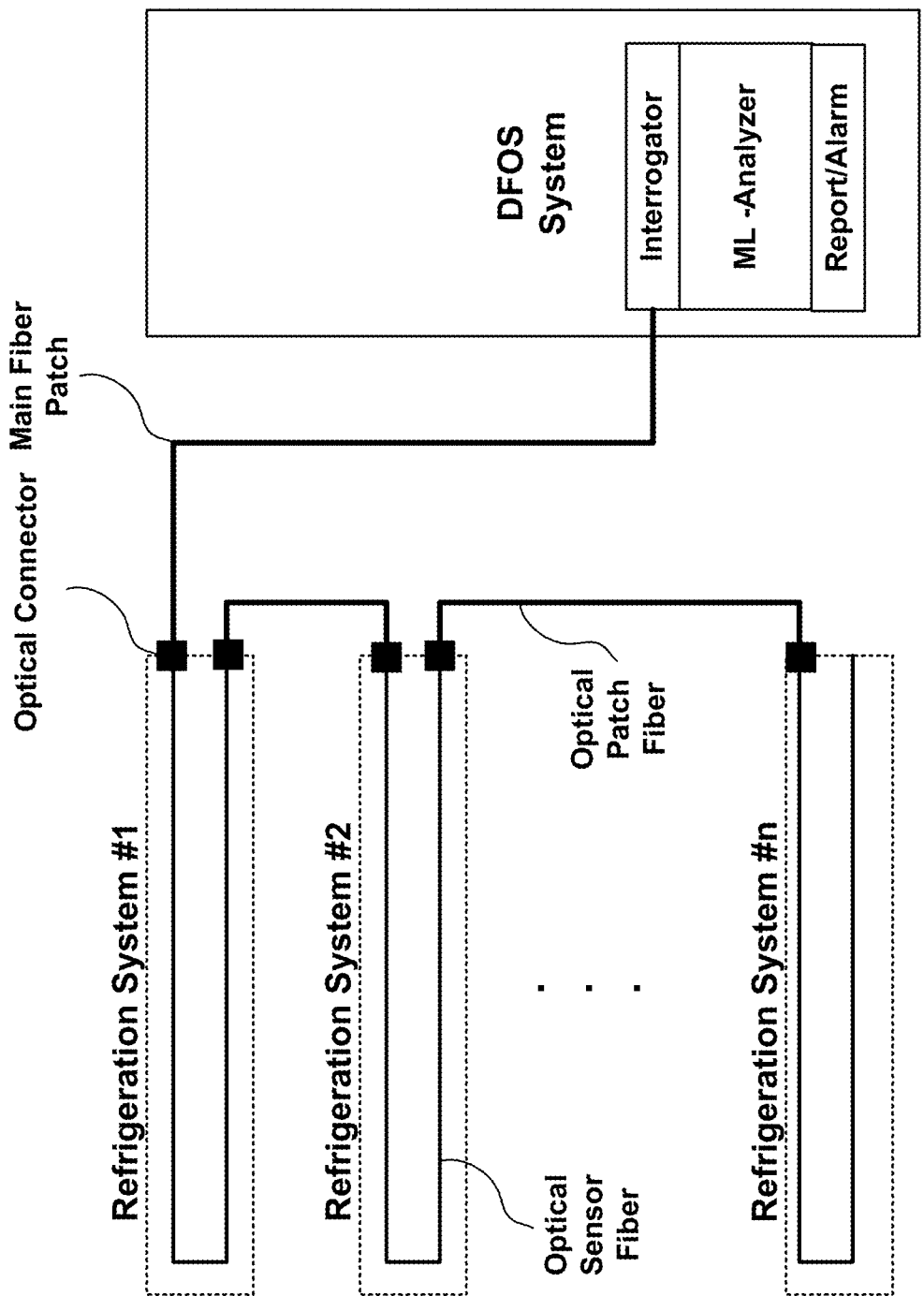
FIG. 2 is a schematic block diagram of an illustrative smart refrigeration system using DFOS according to aspects of the present disclosure.

FIG. 2 is a schematic block diagram of an illustrative smart refrigeration system using DFOS according to aspects of the present disclosure. As shown in the figure, a DFOS system including an interrogator, machine-learning analyzer, and reporting/alarm is used to monitor/control one or more refrigeration systems. Each of the refrigeration systems includes an optical sensor fiber and—in a preferred embodiment one or more connectors to connect the optical sensor fiber optically/mechanically to either another refrigeration system—via optical patch fiber—or to the interrogator via main fiber patch. As those skilled in the art will readily understand and appreciate, such arrangement permits a plurality of refrigeration systems to be "daisy chained" together into a continuous, DFOS sensor system traversing the entire one or more refrigeration systems.

As those skilled in the art will readily understand and appreciate, when a DFOS system is so configured, a single, central interrogator that is located in a central location (office)—for example—may monitor a large number of refrigeration systems that in turn may be co-located in a single location or distributed further as limited by effective DFOS fiber length.

Those skilled in the art that refrigeration temperature management is an important operation especially for supermarkets and warehouses. A useful management system will reduce power consumption and maintain contents—i.e., foodstuffs—at a desirable temperature to—for example—maximize freshness over a period of time. One such management system employed in the art includes thermal sensors located inside refrigeration systems/areas and may include in addition to thermometers, thermal imagers. Collection and coordination of such temperature data/information produced by such sensors and taking appropriate, timely action(s) as a result of the information remains problematic in the art.

Our systems, methods, and structures according to aspects of the present disclosure advantageously provide for a unified, scalable, integrated monitoring and control arrangement that provide real-time data about refrigeration operation such that timely actions may be taken in response when necessary.

As those skilled in the art will now understand and appreciate, systems, methods, and structures according to aspects of the present disclosure permit operational monitoring of refrigeration equipment including upright display cabinets, chest freezers, walk-in cooler/cold rooms, retail showcases and displays in real time, continuously, while in-service. The optical fiber sensor cable positioned inside each refrigerator provides multiple sensing elements along its length, such elements including temperature, strain, and/or vibration—simultaneously. Integration of machine learning—based intelligent analyzer, alarm/reporting mechanisms for early warning event detection, i.e., temperature out of pre-determined ranges, abnormal vibrations, etc., can be detected and responded to. In essence, systems, methods, and structures according to aspects of the present disclosure provide a "smart" refrigeration system.

Figure 3:
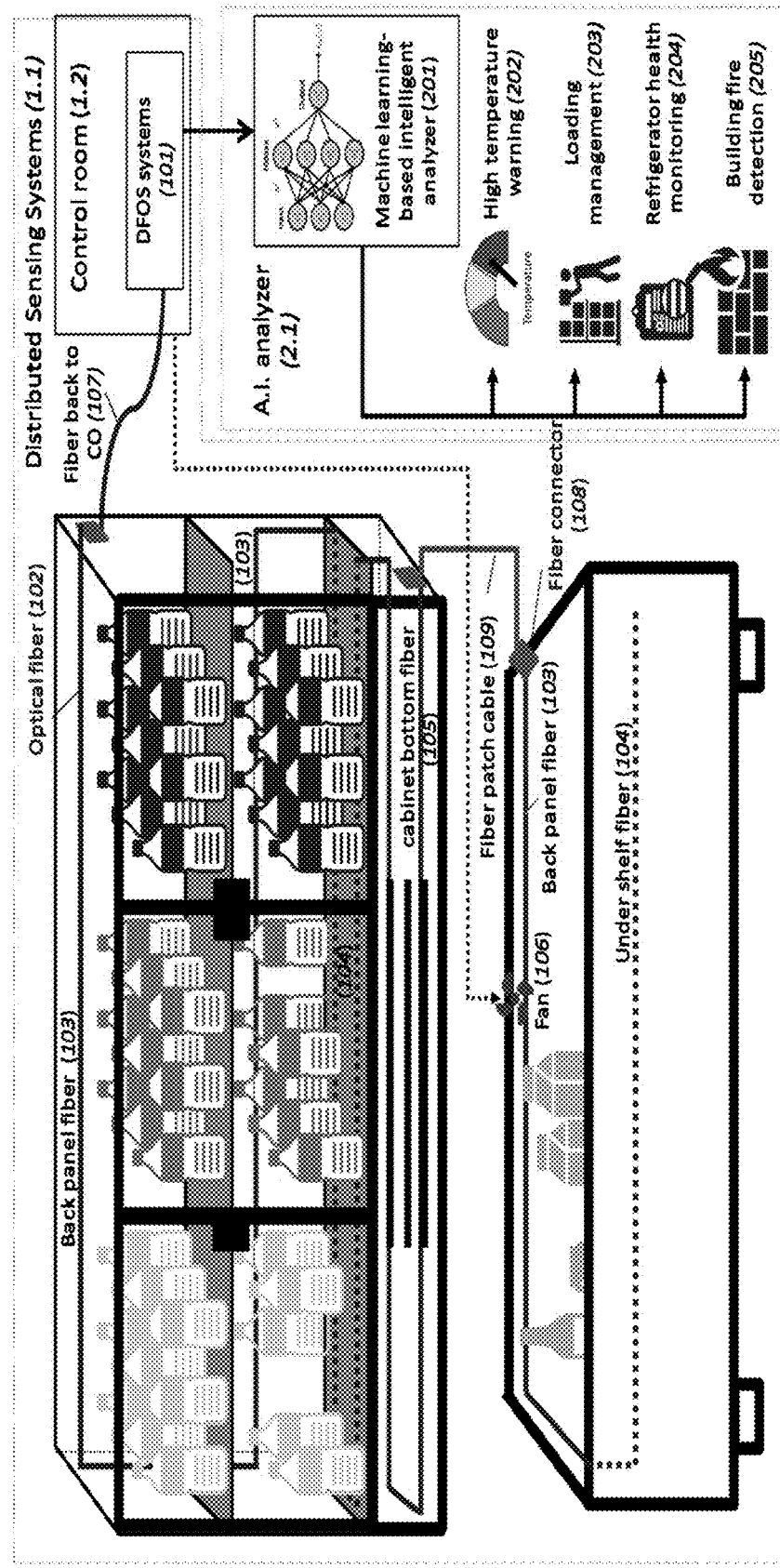
FIG. 3 is a schematic diagram of an illustrative retail smart refrigeration system using DFOS according to aspects of the present disclosure.

FIG. 3 is a schematic diagram of an illustrative retail smart refrigeration system using DFOS according to aspects of the present disclosure. As may be observed from this figure, our approach integrates DFOS technologies (i.e. distributed temperature sensing (DTS), distributed strain sensing (DSS), and distributed vibration sensing (DVS)) and machine learning-based intelligent analyzer—as illustratively shown in FIG. 3. Optical fiber cable positioned in refrigerators is used to obtain sensory data including temperature, strain and vibration for monitoring refrigerator operation and overall health. An intelligent, machine-learning analyzer receives the sensory data from the DFOS and provides intelligent decision making with respect to refrigeration operation.

For distributed sensing such as that illustratively shown, distributed sensing system (1.1), including DFOS system (101) that is operational in any combination of DTS, DSS and DVS via common optical sensing fiber cable (102).

Note that as illustratively shown, DFOS system (101) may be located in a central control room, thereby providing remote monitoring/analysis/action for one or more entire facility(ies) (i.e. supermarket, warehouse, etc.).

Upon receipt of sensory data from the optical fiber (102), DFOS system will provide such data A.I. analyzer (2.1). Such AI analyzer may advantageously include a machine learning-based intelligent analyzer (201) including neural network or other structures. The analyzer receives sensory data from the DFOS (101) and determines whether any notification/alarm/alerts are to be provided and provides same if required.

Those skilled in the art will now understand and appreciate that our inventive arrangement is applicable to numerous applications. We describe four such applications namely, abnormal (out of range) temperature for refrigerator; loading/stock management; refrigerator health monitoring; and building/facility fire detection.

I. Early Warning for Abnormal Refrigerator Temperature

This application employs an optical fiber (102) shown positioned inside a refrigerator and located at back panels of refrigerator cabinet (103), under a shelf (104), and at refrigerator cabinet bottom (i.e., above compressor) (105). Temperature monitoring/mapping is performed by DTS for the entire refrigerator through back panel sensor fibers (103). Any abnormal temperature as determined by pre-determined criteria—caused by an open door or faulty seal, or poorly-functioning refrigeration system will be discovered in early stage to ensure preservation of any refrigerator contents. Once the abnormal temperature is discovered, an appropriate alarm—i.e, high temperature warning (202) may be activated, possibly resulting in technician dispatch for repair. In those situations of an open-refrigerator/freezer, our system and accompanying methods provide a real time temperature monitoring and control of fan/compressor (106) to automatically avoid over cooling to save energy and cost while keep the refrigerator contents at a desirable temperature. Additionally, for applications including a walk-in refrigerator or freezer (cold room), condensate freezing on refrigerant piping caused by—for example—no-functional defroster heater—can be discovered early and cured.

II. Loading Management

Those skilled in the art will appreciate that our inventive systems, methods, and structures provide more useful information in addition to—or instead of—temperature. More specifically, when our optical fiber sensor is employed as a DSS sensor inside the refrigerator—and along a shelf, for example—the DSS may detect any strain and/or shelf deflection due to inventory/contents located on that shelf. Such data may be used by operation systems to track the "fulness" of the refrigeration system with contents/inventory, For example, by comparing fiber strain from each shelf when fully loaded and/or empty/partially loaded, a loading determination may be made and inventory/loading management may be operationally activated. For loading management inside the refrigerator, the fiber under the shelf (104) and DSS are employed. As noted above, by comparing the fiber strain from each shelf of full loading and empty one, the loading management can be provided (203) without on-site screening. Furthermore, an auto replenishment system can be realized.

III. Refrigerator Health Monitoring

Still further, the operational "health" of the refrigerator may be determined according to aspects of the present disclosure. By employing an optical fiber positioned along the cabinet bottom (105), the mechanical health of refrigerators (such as compressor, fans etc.) can be realized via DOFS. More specifically, the refrigerator may be monitored for unusual vibrations using DVS. When the A.I. analyzer is trained or otherwise provided with abnormal vibration patterns, refrigerator health monitoring (204) can be achieved before serious problems develop.

IV. Building Fire Detection

Finally, systems, methods, and structures according to aspects of the present disclosure may provide non-refrigeration monitoring. For example, and as will be understood by those skilled in the art, the optical fiber (102) employed for refrigeration monitoring connects to the DFOS system located in control room (1.2). Hence, the fiber (107) will traverse any monitored building/facility and therefore may advantageously be used for building fire detection (205). We note that as shown illustratively in the figure, and as previously mentioned, combinations of the above applications may be employed in a single system. Of particular advantage, the optical fiber cable (102) can be installed in each refrigerator individually interconnected via fiber connectors (108) as a mechanical/optical interconnection point for cascaded multiple refrigerators—or facility/building monitoring locations. In this inventive manner, a single DFOS system (101) and one fiber cable—possibly elongated in a daisy chain—can monitor the entire suite of refrigeration operations in—for example supermarket/warehouse, that are linked together by fiber patch cords (109) for temperature, machine health monitoring and loading management simultaneously.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS) system for smart refrigeration, said system comprising:
    a refrigeration system including a length of optical sensing fiber disposed therein;
    a distributed optical fiber sensing interrogator in optical communication with the length of optical sensing fiber disposed within the refrigeration system; and
    one or more additional refrigeration systems, each including a respective length of optical sensing fiber, each of the one or more additional refrigeration systems in optical communication with one another and an interrogator in a daisy-chain, series configuration;
    the interrogator configured to:
        determine via DFOS distributed temperature sensing (DTS), a temperature at one or more points along the length of the optical fiber, and
        generating an alert when a determined temperature exceeds a pre-determined threshold; and
    an artificial intelligence, machine-learning based intelligent analyzer for determining any necessity for alert generation;
    wherein one or more of the optical sensing fibers disposed in one or more of the refrigeration systems is located along a shelf of the refrigeration system and provides via distributed strain sensing (DSS), an indication of shelf deflection and load;
    wherein one or more of the optical sensing fibers disposed in one or more of the refrigeration systems is located along a cabinet bottom of the refrigeration system and provides via distributed vibration sensing (DVS) an indication of vibrations occurring within the refrigeration system;
    wherein the refrigeration systems are optically connected to one another by optical patch cables;
    wherein optical patch cables are attachably/detachably connected to the refrigeration system optical sensing fiber via optical connectors.

* * * * *